United States Patent
Nurmse

[11] 4,058,269
[45] Nov. 15, 1977

[54] LINE PROTECTING ELEMENTS FOR USE IN FISHING REELS
[75] Inventor: Karl Nurmse, Svangsta, Sweden
[73] Assignee: ABU Aktiebolag, Svangsta, Sweden
[21] Appl. No.: 520,420
[22] Filed: Nov. 4, 1974
[30] Foreign Application Priority Data
Nov. 8, 1973 Sweden .................. 7315147
[51] Int. Cl.² ............................................ A01K 89/01
[52] U.S. Cl. .......................... 242/84.1 K; 242/84.2 R
[58] Field of Search .................. 242/84.2 R, 84.2 A, 242/84.21 R, 84.21 A, 84.2 F, 84.1 R, 84.1 K

[56] References Cited
U.S. PATENT DOCUMENTS

| 2,663,073 | 12/1953 | Bieber et al. | 242/118.61 X |
| 2,884,211 | 4/1959 | Holahan, Jr. | 242/84.1 K |
| Re. 27,205 | 10/1971 | Willis et al. | 242/84.2 R |

Primary Examiner—Billy S. Taylor

[57] ABSTRACT

This invention relates to a ring-shaped line protecting element to be mounted on the circular edge or rim of an end wall of the line spool in a fishing reel of the type having a part surrounding said end wall and defining a circular space therewith; said protecting element comprises a ring-shaped elastic base formed and dimensioned to be seated on said edge or rim and to be held thereon by being elastically pressed thereon, and an elastic, substantially cylindrical or conical flange projecting from an end portion of said base and back inwardly over said base in radially spaced relation, and adapted to prevent the line from cutting in between said spool end wall and the surrounding part, thereby preventing the line from being wound on a part of the reel other than the spool.

4 Claims, 4 Drawing Figures

LINE PROTECTING ELEMENTS FOR USE IN FISHING REELS

The present invention relates to a ring-shaped line protecting element adapted to be mounted on the circular rim of an end wall of the line spool in a fishing reel and to cover at least partially a circular space between said rim of said end wall and a part of the fishing reel surrounding the end wall, to prevent the line from cutting in between said end wall and said part.

It is desirable and previously known in non-rotary type fishing reels to arrange a line protecting element in the form of felt strips or rings of pipe-cleaner type on the rims of the spool end walls to prevent a loop of the line from cutting in between a spool end wall and the surrounding part, which might result in the line being tied up on some element of the fishing reel or getting fractural indications by jamming, folding, etc. These conventional line protecting elements are comparatively inexpensive and involve low friction but they have some serious disadvantages in that they tend to be rapidly impaired by water and dirt and to collect grit. Already after a short time's use they therefore offer an unsatisfactory protection. Another disadvantage is that it is difficult to exchange them.

The invention has for its object to provide a line protecting element which is readily mountable and thus readily exchangeable and which fulfils its protective function more efficiently than conventional line protecting elements and during a longer time of use.

This object has been achieved by the present invention, wherein the line protecting element comprises a ring-shaped base portion of elastic material having an inner peripheral surface contoured to embrace the rim of a spool end wall or to engage a seat in this rim and dimensioned such that said base portion due to its elasticity can be forced over the rim of the spool end wall and snap into engagement therewith, and a peripherally outer portion comprising a resilient ring-shaped flange projecting from one end of the base portion and back inwardly over the base portion in radially spaced relation thereto, and said flange having its free outer end portion extending so that the flange and the part of the base portion opposite the flange form together an at least approximately U- or V-shaped cross-section, said flange, in at least an outer edge portion thereof, being divided by means of a plurality of slits, into a ring of segments or tongues.

According to a preferred embodiment of the line protecting element of the invention the transition between the base portion and the flange consists of a solid wall portion of curved configuration and those sides of the base portion and the flange which face each other are substantially planar and converge towards the transition between the flange and the base portion which may be substantially of equal axial width.

The line protecting element according to the invention may advantageously be moulded of plastics having resilient properties, such as polyethylene, which also will provide a smooth surface of low friction.

The inner peripheral surface of the base portion is preferably contoured for embracing the end wall rim or, as an alternative, for engaging a seat in said rim, and in both cases the base portion should have a minimum inner diameter slightly less than the maximum diameter of said end wall rim and it should be sufficiently elastic to permit being forced into position on the end wall rim.

According to the flexibility of that part of the flange which consists of a ring of tongues, this part may have a maximum outer diameter which will be slightly less, equal to or slightly larger than the inner diameter of the surrounding part with which the line protecting element is to cooperate, said maximum diameter being of course the maximum outer diameter of the protecting element.

The invention permits making very compact, light and cheap line protecting elements from plastics by moulding, and these elements are highly wear resistant and permanent in shape, another advantage being that they may easily be exchanged by hand.

A specific advantage is that the line protecting element according to this invention may assist in supporting the line spool against the surrounding part of the fishing reel, thereby unloading the member which supports the spool in relation to the frame of the fishing reel and which may consist of a small rod, and thus preventing bending thereof. The fact that the line protecting element can contribute to keeping the line spool in a coaxial position with respect to the surrounding parts (frame, protective cover, winding cup or spool housing) prevents opening or widening of passages that might otherwise admit the loop of a fine line to creep in between the line protecting element and the surrounding part of the fishing reel.

The invention will be described more fully hereinafter with reference to the accompanying drawings, in which.

Figure 1:
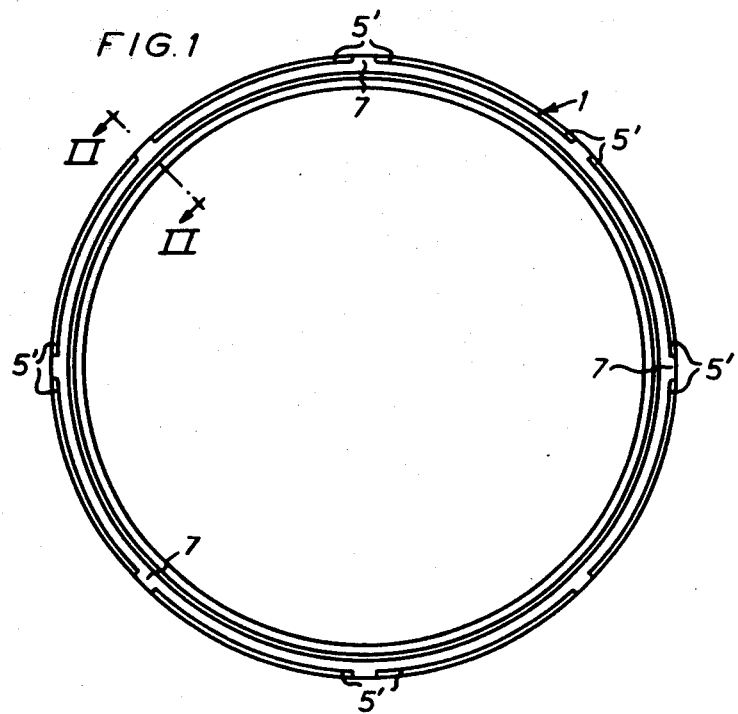
FIG. 1 is an end view of a ring-shaped line protecting element according to the invention.
Figure 2:
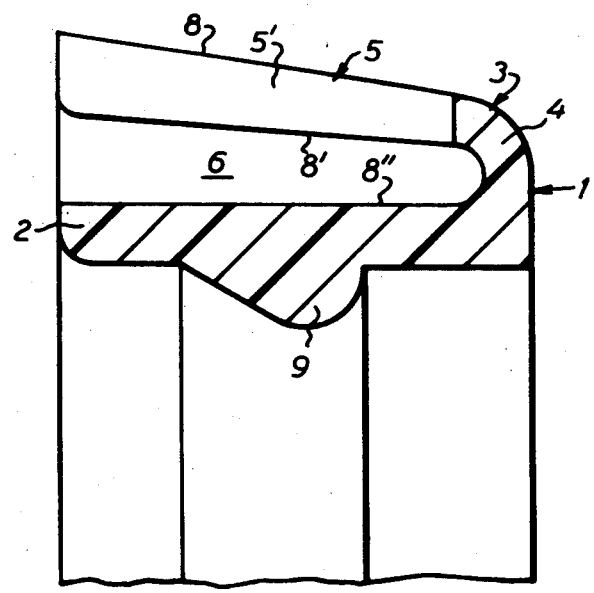
FIG. 2 shows, on a larger scale, a cross-section of the line protecting element along line II—II of FIG. 1.

As shown in FIGS. 1 and 2, the line protecting element 1 of this invention comprises a ring-shaped base portion 2 and a flange 3 extending from one end of the base portion 2 and back inwardly over, and at a radial distance from the base portion 2. The inner peripheral surface of the base portion 2 is formed in a suitable way for being mounted on a circular outer edge portion or rim of an end wall of the line spool of a fishing reel (see FIGS. 3 and 4). The flange 3 comprises a curved transition 4 which merges in the base portion 2 and is followed by a conical flange portion 5. In the embodiment shown, the space 6 between the flange portion 5 and the base portion diverges so as to form a V with a small angle. The wall thickness of the flange increases in the direction of the free flange edge, whereby the outer peripheral surface of the flange will form a larger angle than its inner peripheral surface relative to the axis of the line protecting element 1. Thus, the base portion 2 and the flange 3 form together a ring of substantially or at least approximately U- or V-shaped cross-section. The base portion of the ring 1 is formed integrally with the flange from resilient material and the flange 3 is preferably dimensioned to bear resiliently against a surrounding part of the fishing reel such that the latter will hold the flange bent slightly inwardly when the line protecting element is properly mounted in active position on the spool end wall and closes the space between the spool end wall and the surrounding part. To allow bending of the flange 3 inwardly without folding or wave formation of the outer flange portion 5 this portion is divided into a ring of segments or tongues 5' by means of a number of axial slits 7. In the embodiment shown in FIGS. 1 and 2 this outer flange portion 5 has eight relatively small slits 7 and a corresponding number of segments or tongues 5'. The slits 7 may be smaller in width than shown but they may also be in the form of comparatively wide gaps in which case the segments 5' will assume the form of tongues of relatively small width. The friction of the line protecting element against the surrounding part can be reduced by increasing the slit width and decreasing the tongue width. Also in case of relatively large slits 7, the flange 3 forms a most efficient obstacle which will prevent the line from cutting in between the flange and the surrounding surface on which the flange bears, and it has also been found that the tongues have no tendency to catch the line even if they are directed outwardly from a spool end wall. The slits or gaps 7 need not necessarily be axial but may extend obliquely, that is at an angle to the axis of the ring.

The space 6 between the flange 3 and the base portion 2 may be more or less divergent depending on the desired inclination of the outer peripheral surface 8 of the flange 3 relatively to the axis of the line protecting ring 1. The inclination of the surface 8 is of importance to the degree to which it is desired to bend the flange 3 inwardly by means of a surrounding surface. The minimum slit width is determined on the basis of the fact that the flange 3 shall admit being bent inwardly by the surrounding surface without the flange segments 5' being compressed at the slit edges and thus being deformed. The surfaces 8' and 8" are substantially planar.

The ring 1 may consist of any suitable resilient material, e.g. metal, but it should preferably be made of plastics, such as polyethylene. The material should be sufficiently elastic to produce a resilient resistance to inward bending of the tongues and the flange, and the resiliency of the material should be permanent during a long time when used in such environments for which the line protecting element 1 is intended. The plastics material mentioned by way of example has been found very suitable.

To facilitate mounting of the line protecting element 1, the base portion 2 should be sufficiently elastic so that it can be forced on the spool end wall and be retained on it, and in order that the line protecting element should be safely maintained in position its inner peripheral surface should be properly contoured, for instance as an annular groove for mounting on the rim of a spool end wall (FIG. 3) or as a bead 9 (FIG. 2) for mounting on a spool end wall having an annular groove (FIG. 4), but also other embodiments are conceivable in dependence on the shape of the spool end wall.

Figure 3:
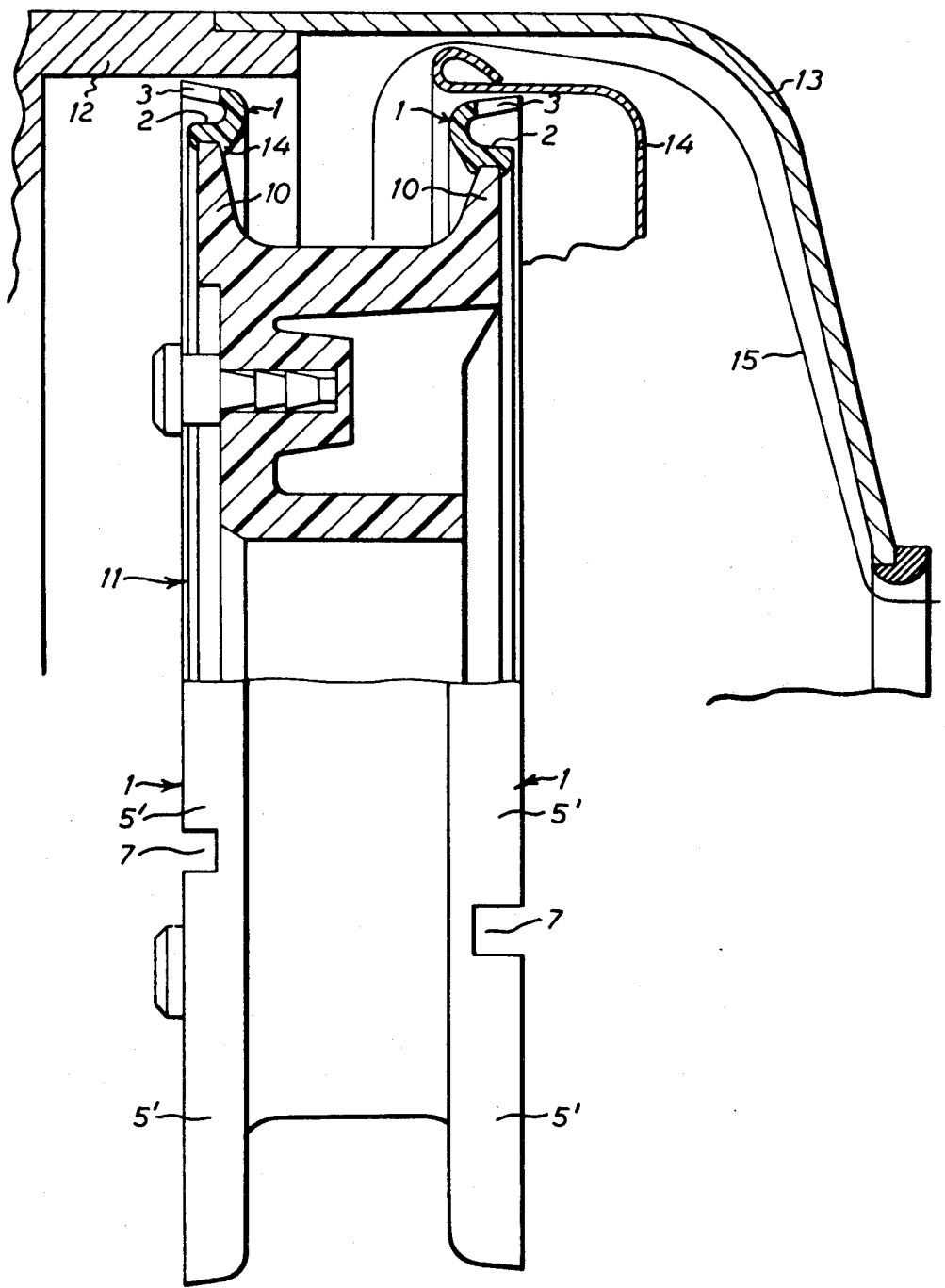
FIGS. 3 and 4 show two examples of how the line protecting element of the invention is used in a closed and an open non-rotary type reel, respectively.

In the case shown in FIG. 3, a line protecting element 1 is applied to either end wall 10 of the line spool 11 in a non-rotary type reel. The line protecting element 1 on the rear end wall 10 is surrounded by a part 12 of the frame on which a protective cover 13 is mounted, and the line protecting element 1 on the front end wall is surrounded by a rotatable winding cup 14. The line spool 11 is non-rotary but may be arranged to reciprocate as the line 15 is wound on the spool 11.

Figure 4:
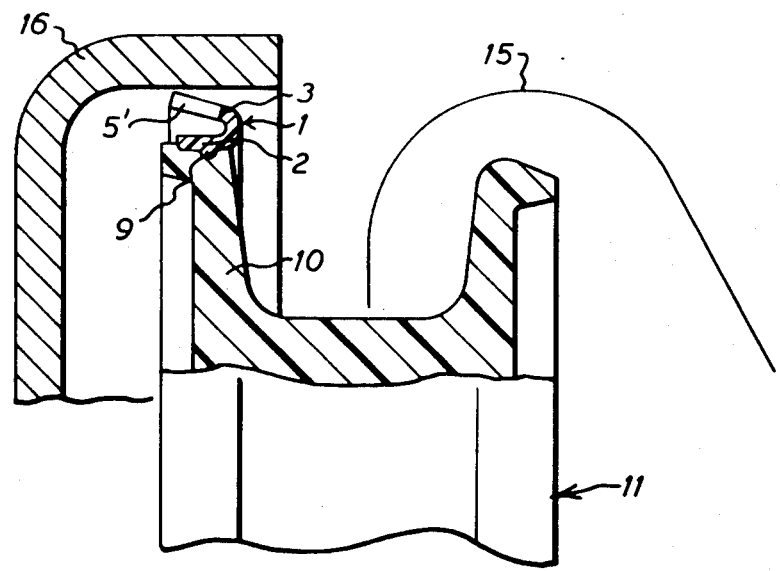

FIG. 4 shows part of the line spool 11 and part of the spool housing 16 in an open non-rotary type reel. A line protecting element 1 of the design shown in FIG. 2 is mounted on the rim of only that end wall 10 of the spool which is surrounded by the spool housing.

In the embodiment of FIG. 3, the base portion 2 of the line protecting element 1 has an annular groove which is defined by edge flanges on either side. The base portion 2 is so dimensioned that it can be forced over the spool end wall rim in order to embrace this rim resiliently by means of the edge flanges. The two line protecting elements 1 in FIG. 3 are inverted and the segments or tongues 5' are directed outwardly from the centre of the spool. In FIG. 3 it is indicated how the line 15 extends from the line spool between the winding cup 14 and the protective cover 13 and out through an aperture in the protective cover.

In the embodiment of FIG. 4, the line protecting element 1 used has a base portion 2 of the design shown in FIG. 2, i.e. having an annular bead 9 on its underside. In this case the circumferential edge of the spool end wall 10 is shaped as a seat for the base portion which retains the line protecting element on the seat by being applied on it with elastic force. Also here the tongues of the flange 3 are directed outwardly from the centre of the spool. The non-rotary spool 11 is adapted to reciprocate axially relative to the spool housing 16 as the line 15 is being wound.

The invention is not restricted to the embodiment shown in FIGS. 1 and 2 or to the modification shown in FIG. 3. The number of slits 7 and the width of slits can be varied so that the flange segments or tongues 5' will have the dimensions desired in each particular case, and in extreme cases (if very low friction is desired) the slit width may be very large. Such obvious modifications fall within the scope of the invention according to the appended claims.

What I claim and desire to secure by Letters Patent is:

1. A ring-shaped line protecting element comprising a piece of elastic material, a line spool in a fishing reel having said elastic material mounted on a circular rim of an end wall of said line spool to cover at least partially a circular space between said rim of said end wall and a part of said fishing reel surrounding said end wall, and to prevent the line from cutting in between said end wall and said part, said elastic material line protecting element comprising a ring-shaped base portion having an inner peripheral surface shaped to be supported by and to engage said circular rim, an outer peripheral surface and a ring-shaped end projection which extends substantially radially outward from one end of said base portion wherein said line protecting element also comprises a ring-shaped resilient flange which extends from one outer end of said ring-shaped projection substantially axially in the direction of the other end of said base portion in radially spaced relation thereto, said substantially axially extending flange spanning the gap between said spool flange and said surrounding part of the fishing reel and having at least an outer edge portion thereof slitted into a ring of substantially axially extending resilient segments for contacting said surrounding part with a light contacting pressure and low friction.

2. A line protecting element as claimed in claim 1, wherein the said end projection of the base portion forms between the latter and the flange a solid transition wall portion of curved configuration.

3. A line protecting element as claimed in claim 2, wherein at least the outer peripheral surface of said substantially axially extending flange has a tapered form sloping towards the transition between the flange and the base portion.

4. A line protecting element as claimed in claim 1, wherein the flange and the base portion are substantially of equal axial width.

* * * * *